March 14, 1933.  G. H. TABER  1,901,786
COVER FOR USE IN TESTING VEHICLE WHEELS FOR MISALIGNMENT
Filed Feb. 9, 1931
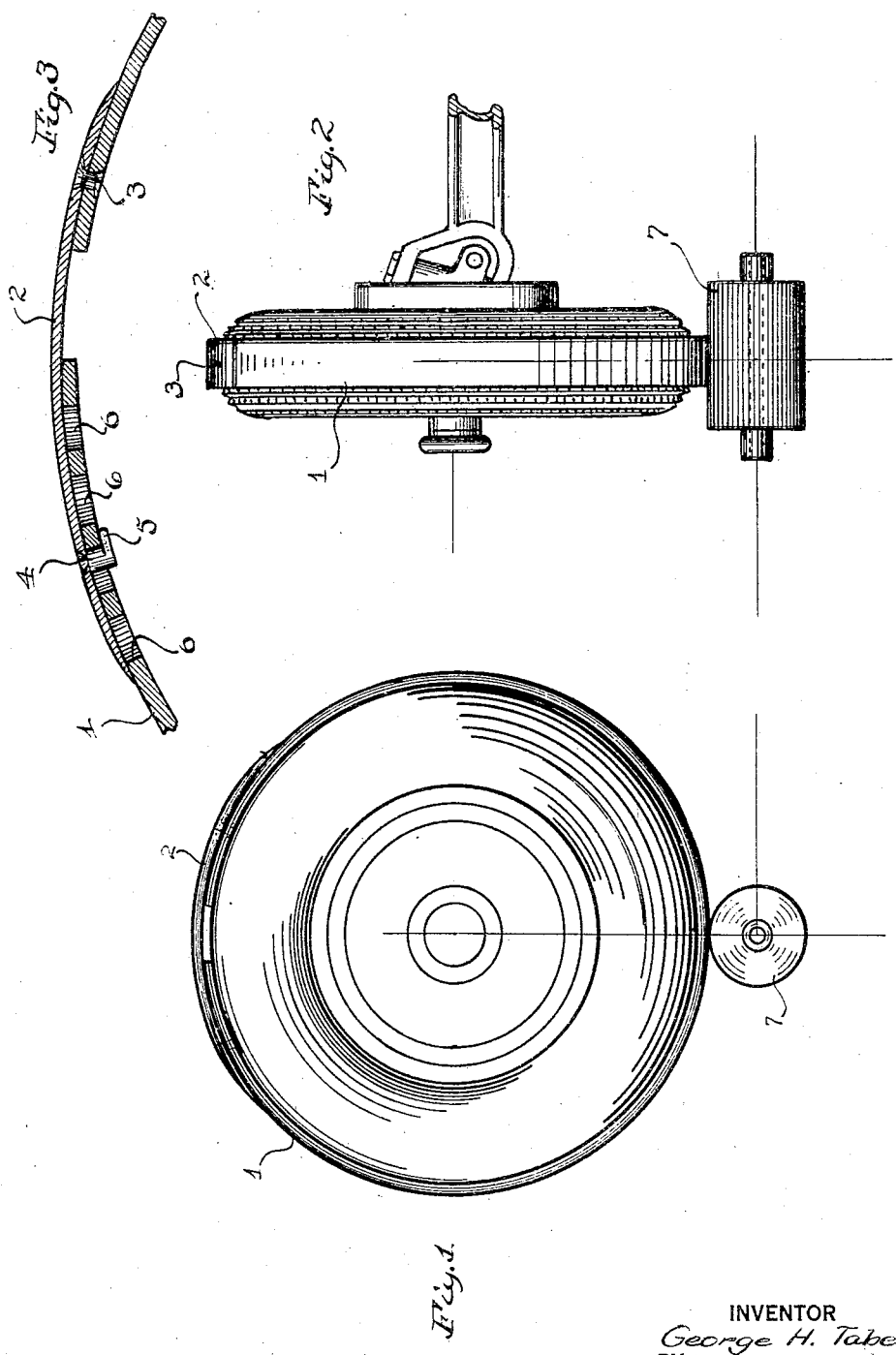
INVENTOR
George H. Taber
BY
his ATTORNEY Patented Mar. 14, 1933

1,901,786

UNITED STATES PATENT OFFICE

GEORGE H. TABER, OF BINGHAMTON, NEW YORK

COVER FOR USE IN TESTING VEHICLE WHEELS FOR MISALIGNMENT

Application filed February 9, 1931. Serial No. 514,405.

The present invention relates to a temporary wheel band or cover or pneumatic tire engaging band or cover for use in the carrying out of a method of testing vehicle wheels for misalignment. An object of this invention is to make it possible to eliminate errors caused by the non-skid design on the perimeter or tread of a tire casing.

To this and other ends, the invention includes the employment of a suitably constructed peripheral band or cover for placement on the outer or tread portion of a tire casing of a wheel during the performing of the method hereinafter described.

In the drawing:

Fig. 1 shows a vehicle wheel in side elevation with a cover in position thereon and engaging the wheel engaging member of the testing machine;

Fig. 2 is a front view of a covered wheel engaging the wheel engaging member of the testing machine; and Fig. 3 is an enlarged fragmentary section of the wheel cover.

I have found in testing vehicle wheels, as to alignment or misalignment, with testing machines which employ a wheel engaging member that is subject to the side thrust of a misaligned wheel when rotating against the engaging member that substantial or material errors occur due to certain inequalities or certain non-uniform characteristics as to the shape of the perimeter or tread of the tire casing on the wheel undergoing the test, particularly such is true when a non-skid tire casing has in certain instances become worn and such is also true in certain cases of tires or casings having non-skid designs.

According to this invention these errors are eliminated by covering that portion or tread of the tire casing which is to engage the wheel engaging member of the testing machine with a cover of non-yieldable material, the cover being held in firm engagement with the tread of the tire casing so that such tread cannot shift and produce any error.

A cover of novel form which may be used for this purpose comprises a transversely split metallic band 1 with a cylindrical surface and having means for detachably connecting the ends at the split. In this instance, the band 1 has an extension coupling plate 2 secured thereto by a rivet 3 to bridge the split or gap. Projecting from the inner face of this coupling plate is a projection 4 formed with a lateral extension 5 at its end. This projection is adapted to pass through any one of the openings 6 in the other end of the split band or cover, the lateral projection 5 engaging the inner face of the band to hold the coupling piece in interlocking relation.

In applying this cover to the tire casing 1 the tire should be partially deflated so that the cover or band may be slipped sidewise with respect to the casing. Thereafter the tire is inflated so that its casing tread enters into firm binding engagement with the cover or band, producing a compression of a surface of the casing tread, thus, preventing any lateral movement of the band on the casing from a deflection of the design of the tread. The cover is then brought into engagement with the wheel engaging member 7 of the testing machine. In this instance, this wheel engaging member is in the form of a roller which turns with the wheel and which also has an axial movement due to the action of the misalignment of the wheel. The invention of course, is not limited to a wheel engaging member of this type. Any member may be used that will move as the wheel is rotated in a direction parallel with the axis of the wheel and also in such a manner that the portion engaged by the band will move in the same direction as the engaging portion of the band.

In short it will be noted that the band 1 which is herein described as having a cylindrical surface provides the operable element of a cover in which the outer surface thereof is relatively uniform whereby the true action of the wheel can be transmitted by the cover when properly positioned on and in respect to the wheel. In the preferred form shown the outer surface is cylindrical or substantially so.

From the foregoing it will be seen that a method has been provided by which the errors due to the non-skid design on the perimeter or tread of the tire casing have been eliminated. A cover member has been provided for the perimeter of a tire casing to hold a non-skid design against movement and to provide a surface which will accurately communicate or transmit to the wheel engaging member of a testing machine the correct action of the wheel to be tested.

It is a matter of common knowledge that the treads of pneumatic tires wear unevenly. This is particularly true of tires having the tread portion provided with anti-skid projections. As a result, the line of wear of the tire of a misaligned wheel is not equidistant at all points from the sides of the wheel. Thus a wheel having a worn tire and tested for alignment will not produce an accurate showing. To allow for the uneven wear of the tire and produce a traction line equidistant from the sides of the wheel and in a median plane thereof, the band 1 is adjusted upon and rigidly secured to the tread of the worn tire, thus assuring accuracy in the showing when testing the wheel for alignment.

What I claim as my invention and desire to secure by Letters Patent is:

1. A cover for use in testing a wheel for its misalignment comprising a non-yielding band for covering the tread of the tire casing, said band being transversely split, and a coupling plate secured at one end to the outer side of the band on one side of the split and having projecting means on its under face for interlocking with the band on the other side of the split.

2. A cover for use in testing a wheel for its misalignment comprising a non-yielding band for covering the tread of the tire casing, said band being transversely split, and a coupling plate secured at one end to the outer side of the band on one side of the split and having projecting means on its under face for interlocking with the band on the other side of the split, the ends of the coupling plate being chamfered so that proper rolling action is obtained at the ends of the plate.

3. A cover for use during the testing of a pneumatic vehicle wheel for misalignment, which cover comprises a band of relatively non-yielding material adapted for placement on the tread portion of the outer casing of the tire of the wheel in a manner such that the band can be relied upon to transmit correctly the action of the wheel during the testing thereof, said cover also being constructed so that the band is retained in proper wheel testing position, in firm engagement with said tread portion of the casing, and against lateral shifting in respect to the wheel because of the band peripherally compressing the tire casing, said band being substantially cylindrical at the outer portion thereof so that when said outer portion engages the proper member of a testing machine during a rotation of the wheel there is communicated to the testing machine the correct plane of the wheel movement.

4. A cover for use in the testing of a pneumatic vehicle wheel as to alignment or misalignment, which cover comprises a band of non-yielding material adapted to be mounted on the periphery of the vehicle tire and constructed so as to be held in place on the tread portion of the casing of the tire when applied to the tire in a manner such that the casing presses outwardly against the band and also in a manner such that the band transmits correctly the action of the wheel to which the band is applied, the outer portion of the band being relatively uniform whereby when said outer portion of the band moves in engagement with the proper member of a testing machine during the rotation of the wheel there is communicated to said member of the testing machine the correct plane of the wheel movement or motion relative to the wheel axis.

GEORGE H. TABER.